(12) United States Patent
Almazán et al.

(10) Patent No.: US 11,715,292 B2
(45) Date of Patent: Aug. 1, 2023

(54) METHODS AND APPARATUS TO PERFORM IMAGE ANALYSES IN A COMPUTING ENVIRONMENT

(71) Applicant: Nielsen Consumer LLC, New York, NY (US)

(72) Inventors: Emilio Almazán, Alcorcón (ES); Javier Tovar Velasco, Cigales (ES); Roberto Arroyo, Guadalajara (ES); Diego González Serrador, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 59 days.

(21) Appl. No.: 17/340,958

(22) Filed: Jun. 7, 2021

(65) Prior Publication Data

US 2021/0366149 A1    Nov. 25, 2021

Related U.S. Application Data

(63) Continuation of application No. 16/230,920, filed on Dec. 21, 2018, now Pat. No. 11,030,769, which is a
(Continued)

(51) Int. Cl.
*G06V 20/00* (2022.01)
*G06T 7/73* (2017.01)
(Continued)

(52) U.S. Cl.
CPC ............... *G06V 20/00* (2022.01); *G06T 7/73* (2017.01); *G06T 7/77* (2017.01); *G06V 10/454* (2022.01);
(Continued)

(58) Field of Classification Search
None
See application file for complete search history.

(56) References Cited

U.S. PATENT DOCUMENTS

| 8,712,862 B2 | 4/2014 | Gokturk et al. |
| 8,793,201 B1 | 7/2014 | Wang et al. |

(Continued)

FOREIGN PATENT DOCUMENTS

EP    3217324    9/2017

OTHER PUBLICATIONS

Hare et al., "Placing Photos with a Multimodal Probability Density Function," Proceedings of the International Conference on Multimedia Retrieval, Apr. 1, 2014, 8 pages.
(Continued)

*Primary Examiner* — Leon Flores
(74) *Attorney, Agent, or Firm* — Hanley, Flight & Zimmerman, LLC

(57) ABSTRACT

An example apparatus includes a feature extractor to generate a first image descriptor based on a first image of a first retail product tag corresponding to a first category, the first image descriptor representative of one or more visual features of the first retail product tag; a feature descriptor generator to generate a feature descriptor corresponding to the first retail product tag by concatenating the first image descriptor and a first category signature corresponding to the first retailer category; and a classifier to generate a first probability value corresponding to a first type of promotional product tag and a second probability value corresponding to a second type of promotional product tag based on the feature descriptor; and determine whether the first retail product tag corresponds to the first type of promotional product tag or the second type of promotional product tag based on the first and second probability values.

20 Claims, 8 Drawing Sheets

Related U.S. Application Data continuation-in-part of application No. PCT/IB2018/001433, filed on Nov. 13, 2018.

(51) Int. Cl.
| | | |
|---|---|---|
| *G06T 7/77* | (2017.01) | |
| *G06V 10/764* | (2022.01) | |
| *G06V 10/82* | (2022.01) | |
| *G06V 10/44* | (2022.01) | |

(52) U.S. Cl.
CPC ............ *G06V 10/764* (2022.01); *G06V 10/82* (2022.01); *G06T 2207/20084* (2013.01)

(56) References Cited

U.S. PATENT DOCUMENTS

| | | | |
|---|---|---|---|
| 9,524,486 | B2 | 12/2016 | Wu et al. |
| 10,019,653 | B2 | 7/2018 | Wilf et al. |
| 11,030,769 | B2 * | 6/2021 | Almazán ................ G06V 10/82 |
| 2008/0159634 | A1 | 7/2008 | Sharma et al. |
| 2012/0117072 | A1 | 5/2012 | Gokturk et al. |
| 2012/0314941 | A1 | 12/2012 | Kannan et al. |
| 2014/0023278 | A1 | 1/2014 | Krishna Kumar et al. |
| 2014/0372351 | A1 | 12/2014 | Sun et al. |
| 2015/0088862 | A1 | 3/2015 | Umeda |
| 2016/0078282 | A1 | 3/2016 | Lee et al. |
| 2016/0110630 | A1 | 4/2016 | Heusch et al. |
| 2016/0155011 | A1 | 6/2016 | Sulc et al. |
| 2016/0224837 | A1 | 8/2016 | Lipert et al. |
| 2017/0024641 | A1 | 1/2017 | Wierzynski |
| 2017/0224641 | A1 | 8/2017 | Geschwind et al. |
| 2017/0372169 | A1 | 12/2017 | Li |
| 2018/0060649 | A1 | 3/2018 | Kastaniotis et al. |
| 2018/0107968 | A1 | 4/2018 | Wu et al. |
| 2018/0181843 | A1 | 6/2018 | Brown et al. |
| 2020/0151902 | A1 | 5/2020 | Almazán et al. |
| 2020/0210781 | A1 | 7/2020 | Desilets-Benoit et al. |

OTHER PUBLICATIONS

Freytag et al., "Selecting Influential Examples: Active Learning with Expected Model Output Changes," Computer Vision—ECCV, vol. 8692, 2014, 16 pages.

Hou et al., "VegFru: A Domain-specific Dataset for Fine-grained Visual Categorization," 2017 IEEE International Conference on Computer Vision, Oct. 22, 2017, 9 pages.

Kading et al., "Fine-tuning Deep Neural Networks in Continuous Learning Scenarios," Asian Conference on Computer Vision, vol. 10118, Mar. 16, 2017, 17 pages.

Stanford CS Class CS231n. CS231n Convolutional Neural Networks for Visual Recognition [online], [retrieved on Feb. 27, 2018]. Retrieved from the Internet: <http://cs231n.github.io/optimization-2/>, 10 pages.

Kading et al., "Active Learning and Discovery of Object Categories in the Presence of Unnameable Instances," 2015 IEEE Conference on Computer Vision and Pattern Recognition, Jun. 7, 2015, pp. 4343-4352, 10 pages.

Gebru et al., "Fine-grained Recognition in the Wild: A Multi-Task Domain Adaptation Approach," IEEE International Conference on Computer Vision, Sep. 7, 2017, 10 pages.

International Searching Authority, "International Search Report and Written Opinion," mailed in connection with International Patent Application No. PCT/IB2018/001485, dated Aug. 7, 2019, 8 pages.

International Searching Authority, "International Search Report and Written Opinion," mailed in connection with International Patent Application No. PCT/IB2018/001433, dated Aug. 12, 2019, 9 pages.

United States Patent and Trademark Office, "Non-final Office Action," mailed in connection with U.S. Appl. No. 16/249,448, dated Jul. 14, 2020, 17 pages.

United States Patent and Trademark Office, "Final Office Action," mailed in connection with U.S. Appl. No. 16/249,448, dated Nov. 12, 2020, 19 pages.

United States Patent and Trademark Office, "Advisory Action," mailed in connection with U.S. Appl. No. 16/249,448, dated Jan. 28, 2021, 5 pages.

United States Patent and Trademark Office, "Corrected Notice of Allowability," mailed in connection with U.S. Appl. No. 16/230,920, dated Feb. 17, 2021, 3 pages.

United States Patent and Trademark Office, "Notice of Allowance," mailed in connection with U.S. Appl. No. 16/230,920, dated Jan. 29, 2021, 12 pages.

United States Patent and Trademark Office, "Corrected Notice of Allowability," mailed in connection with U.S. Appl. No. 16/230,920, dated Nov. 24, 2020, 8 pages.

United States Patent and Trademark Office, "Notice of Allowance," mailed in connection with U.S. Appl. No. 16/230,920, dated Oct. 15, 2020, 10 pages.

United States Patent and Trademark Office, "Non-final Office Action," mailed in connection with U.S. Appl. No. 16/230,920, dated Jun. 10, 2020, 10 pages.

International Bureau, "International Preliminary Report on Patentability," mailed in connection with International Patent Application No. PCT/IB2018/001485, dated May 18, 2021, 6 pages.

\* cited by examiner

TRAINING PHASE

RECOGNNITION PHASE

RECOGNITION PHASE

METHODS AND APPARATUS TO PERFORM IMAGE ANALYSES IN A COMPUTING ENVIRONMENT

RELATED APPLICATIONS

This patent arises from a continuation of U.S. patent application Ser. No. 16/230,920, filed on Dec. 21, 2018, entitled "METHODS AND APPARATUS TO MODEL CONSUMER CHOICE SOURCING," which is a continuation in part of PCT Patent Application No. PCT/IB2018/001433, which was filed on Nov. 13, 2018. U.S. patent application Ser. No. 16/230,920 and PCT Patent Application No. PCT/IB2018/001433 are hereby incorporated herein by reference in their entireties.

FIELD OF THE DISCLOSURE

This disclosure relates generally to computing systems, and, more particularly, to methods and apparatus to perform image analyses in a computing environment.

BACKGROUND

Image recognition involves computer-aided techniques to analyze pictures or photographs to determine and/or identify the content of the captured scene (e.g., the recognition of the general subject matter of the scene and/or the recognition of individual objects within the scene). Such techniques are useful in different applications across different industries. For example, retail establishments, product manufacturers, and other business establishments may take advantage of image recognition techniques of photographs of such establishments (e.g., pictures of product shelving) to identify quantities and/or types of products in inventory, to identify shelves that need to be restocked and/or the frequency with which products need restocking, to recognize and read product barcodes, to assess product arrangements and displays, etc.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1A:
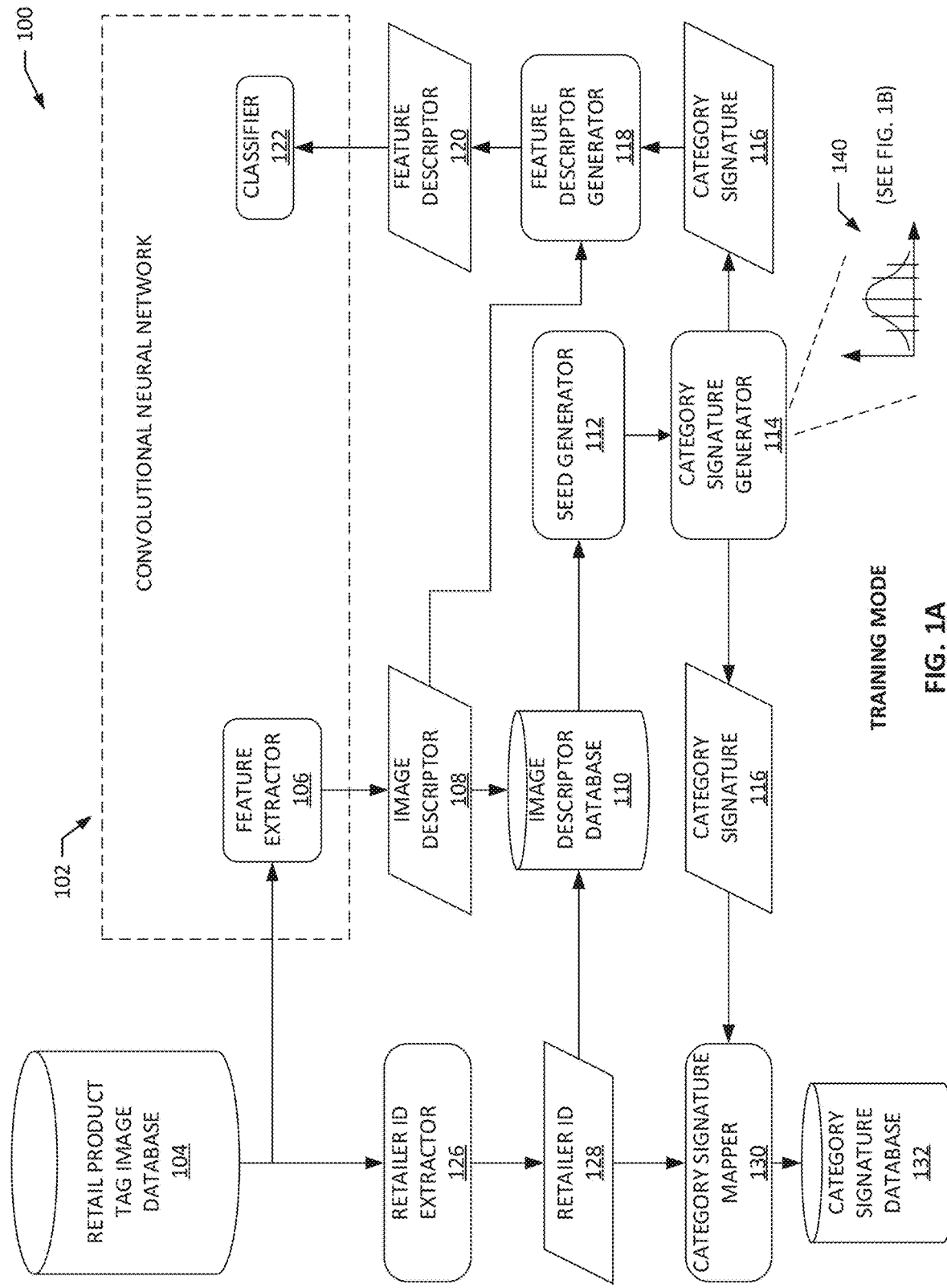
FIG. 1A is a block diagram of an example apparatus in training mode to train a convolutional neural network (CNN) to classify retail product tags using a category signature.

In the retail industry, retailers use different types of retail product tags to emphasize or advertise different pricing models for different types of promotions. Across retailers, various different looking retail product tags may be used for the same type of promotion. For example, a first retailer could create a "two for one" retail product tag that is visibly different (e.g., different color, different type font, different logos, different information, different arrangement of information, etc.) from a "two for one" retail product tag of a second retailer.

When performing retail audits or market analyses for product placements and sales, sorting and categorizing different retail product tags by promotion type and retailer can be performed through human visual inspection using cognitive recognition of persons and human intuition. Such a human-based process is time-consuming and error-prone due to inconsistencies across different human auditors and/or inconsistencies of a same human auditor over time. However, computerizing such a process to recognize different retail product tags of different promotion types and across multiple retailers presents significant challenges.

Retailer market studies can use deep learning techniques as a way to detect and classify promotions associated with their products. In prior deep learning techniques, a single convolutional neural network (CNN) is trained and utilized specifically for use with a respective retailer to detect or classify retail product tags corresponding to that retailer. However, this is not an easily scalable solution or a solution that is easily updatable or maintained across multiple retailers. For example, a challenge arises when a second retailer or more retailers are introduced into a market study because a second CNN or more CNNs need to be trained for the second or more retailer categories. As more retailers are added, more CNNs are needed to be trained and maintained. This requires a significant amount of time, supervision, and expertise. In other prior deep learning techniques, a single CNN is trained and utilized for use with two or more respective retailers to detect or classify retail product tags corresponding to the two or more retailers. Challenges arise when there is interference (e.g., similar appearance) between retail product tags of different retailers. For example, a first retailer may have a multi-buy retail product tag image that is of similar appearance to a price reduction retail product tag image of a second retailer. In this example, the CNN fails to properly classify the retailer product tag image of the first retailer due to the interference (e.g., similar appearance) with the retail product tag image of the second retailer.

As used herein, a categorical entity, a retailer category, or a category refers to a retailer that sells goods and/or services. Categorical entity, retailer category, retailer, and category are used interchangeably throughout. In examples disclosed herein, a categorical entity, retailer category, and/or category is, but not limited to, a chain of stores owned by a same business entity (e.g., Gap Inc., Banana Republic LLC, Old Navy LLC, Athleta Inc. and Intermix LLC), a single store (e.g., a small family owned business such as a mom and pop shop), and/or sub-category stores of large retailers such as a big box store, a big box store express, a Best Buy® store, a Best Buy® Mobile store, a Target® store, a Super Target® store, a Walmart® store, a Walmart Express store, etc.

Examples disclosed herein overcome the above-mentioned challenges and other challenges by using multi-class classification models in which the final classes (e.g., types of promotions) of retail product tags to be recognized are classified within their own retailer categories. For example, when identifying a type of promotion of a retail product tag of a retailer, examples disclosed herein differentiate between different retailer categories of the retail product tag using respective category signatures generated for corresponding ones of the retailer categories. For example, retailer categories are used to train the CNN so that during a recognition phase, the CNN can differentiate between retailer product tags of different retailer categories. Examples disclosed incorporate the retailer category information into the CNN process by associating the unique category signatures to corresponding retailers based on retailer identifiers or retailer metadata in retailer product tags.

In examples disclosed herein, a category signature corresponding to an example retailer category is provided to a CNN to classify input data. In examples disclosed herein, a category signature is a layer of information that is unique for each retailer category. The category signature identifies a category/categorical entity of a product tag. In some examples, the category signature is a value having a particular bit length and could be implemented as a vector, a one-dimensional array of float values (e.g., floating-point numbers) etc., that is added, augmented, appended, or combined with an image descriptor of a retail product tag to form a feature descriptor that is analyzed and classified by a classifier of the CNN.

Examples disclosed herein facilitate the aggregating of category information in a CNN while reducing complexity associated with CNN-based detection and/or classification of retail product tags across multiple retailers. For example, techniques disclosed herein facilitate training a CNN using category signatures corresponding to different categorical entities. By using category signatures for different categorical entities, examples disclosed herein use a single CNN to detect and/or classify retail product tags by promotional type from the different categorical entities. That is, the single CNN is trained to differentiate retail product tags from different retailers based on the category signatures of those retailers.

In examples disclosed herein, a CNN is a network of interconnected neurons (e.g., nodes) arranged or connected to one another in configurations that enable analyzing input data (e.g., image data) to generate different probabilities indicative of likelihoods that different features are present in that input data. In examples disclosed herein, a CNN is provided input image data representative of retail product tags from different categorical entities, and the CNN generates probability values indicative of the likelihoods of the presence of features that correspond to different retail product tags of the categorical entities.

The category corresponding to a product tag (e.g., input data) may be identified by a CNN from metadata located in an image or an image file of a product tag. In examples disclosed herein, metadata is data (e.g., information) that provides information about other data (e.g., a retail product tag). In some examples, metadata of a retail product tag image includes a description, an identifier, camera details such as shutter speed, focal depth, etc., keywords related to the image such as captions, titles, comments, etc., and administrative information such as licensing rights, restrictions on use, etc. In examples disclosed herein, metadata includes a category identifier that identifies a corresponding retailer of a retail product tag. In some examples, the category identifier is geographic location coordinate information of a retail store provided by an image capturing device when capturing images of retail product tags. In such examples, the geographical location information could be used as an identifier of a particular retailer. In other examples, the category identifier could be a value provided to an image capturing device via, for example, user input, scanning a barcode, etc. when capturing images of retail product tags.

A CNN analyzes input image data to generate probability values indicative of likelihoods that input image data corresponds to different types of retail product tags. In examples disclosed herein, a type of retail product tag is a product tag for a particular type of promotion of a corresponding product. One type of promotion is a multi-buy promotion (e.g., "Buy two get one free", "Get two for the price of one", "Buy three for $6", etc.). A second type of promotion is a price reduction promotion (e.g., "50% off all produce items", "All items are 20% off original price", "25% OFF", etc.). Examples disclosed herein may also be employed with other types of promotions.

Figure 2:
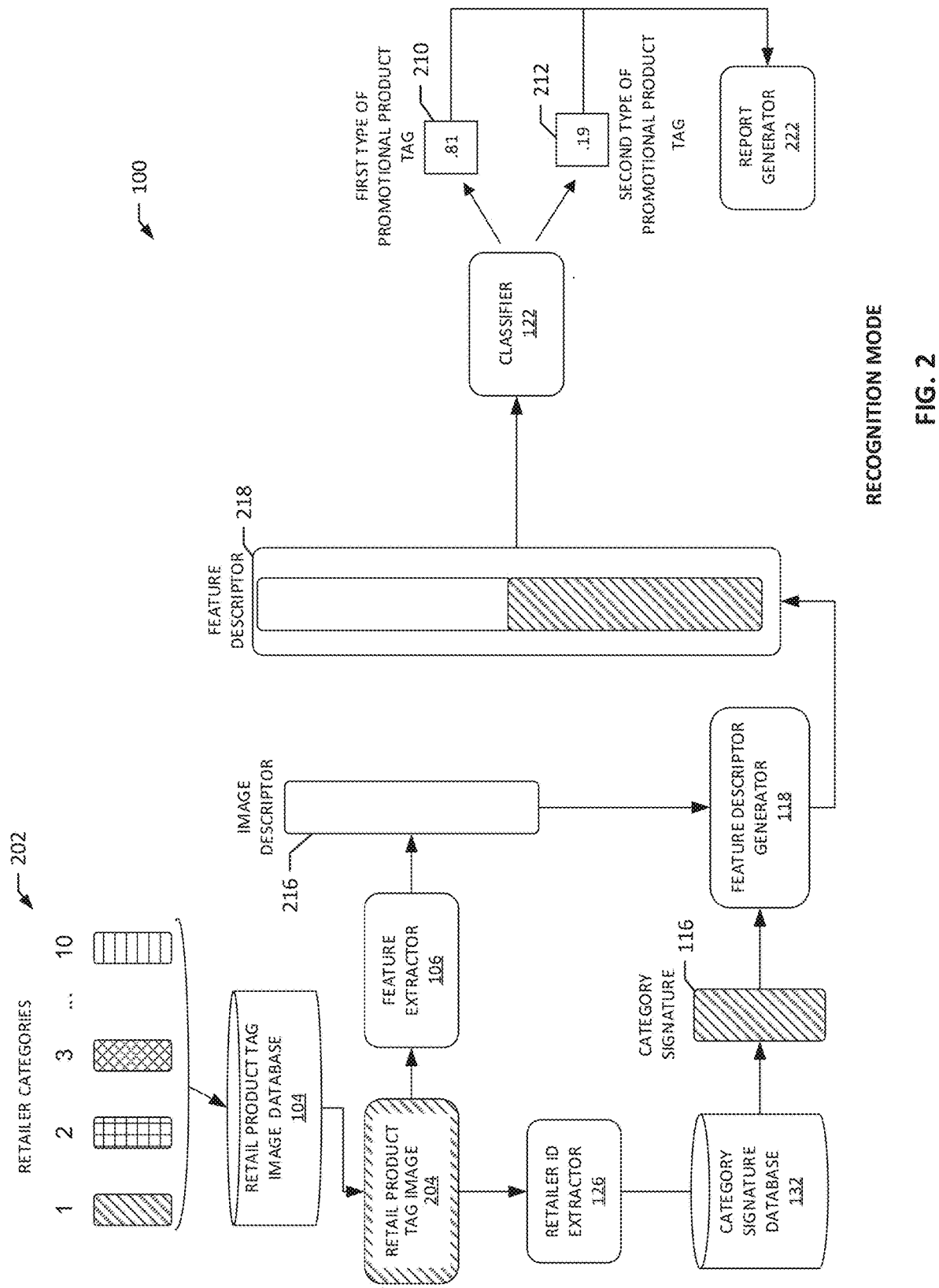
FIG. 2 is a block diagram of the example apparatus of FIG. 1A operating in a recognition mode to classify retail product tags using the training CNN and the category signature.

FIGS. 1A and 2 illustrate an example apparatus 100 that employs a CNN 102 to classify retail product tags corresponding to different categorical entities. In FIG. 1A, the example apparatus 100 is shown in a training mode of a training phase in which category signatures are generated and the CNN 102 is trained to recognize and classify promotional product tags of different retailers using such category signatures. In FIG. 2, the apparatus 100 is shown in a recognition mode of a recognition phase in which the apparatus 100 utilizes category signatures generated during the training mode of FIG. 1A to analyze input image data of retail product tags and to classify the input image data as representative of types of promotions of different retailers.

Turning to FIG. 1A, the example CNN 102 includes a neural network that analyzes input images and learns system responses corresponding to different features in such input images. An input image is a matrix of pixel values that define different colors to collectively represent a visual depiction of a subject. The example CNN 102 has four main operations to analyze the matrix of pixel values. The example operations include a convolution operation, non-linearity operation, a pooling or sub-sampling operation, and a classification operation. The convolution operation extracts features via a filter, from the input image. The filter is a weighted matrix used to analyze the input image matrix. Examples of extracted features include a rounded edge, a circle, a color, etc. The extracted features of the input image are sent to the non-linearity operation of the CNN 102. The non-linearity operation converts the extracted features into a non-linear matrix by replacing negative pixel values with a zero. After the extracted features are non-linearized, the pooling operation samples the extracted features to reduce the dimension of the matrices. The final reduced matrices are then sent to the classification operation of the CNN 102. At the classification operation, the reduced matrices are used to estimate probabilities for the input image. The probabilities correspond to likely classifications of the input image.

In some examples, the filters and operations in a CNN 102 are to identify the most important regions of the input image (e.g., the CNN 102 determines the most discriminative features of the input image that make it unique and distinct from the other input images). For example, if the CNN 102 is to classify Coca-Cola® drink label and a Pepsi® drink label. The example CNN 102 will determine the red color of the Coca-Cola® drink label is a significant feature and therefore the image descriptor of a Coca-Cola® drink label will contain information related to the red color. This is achieved by using filters that get activated in regions with red color. In some examples, there are a plurality of filters, and each filter is to determine different features of the image (e.g., a filter may activate when there is a face, another filter activates when there is a screen, etc.). Eventually, all the information is compacted using a sub-sampling operation, leading to a detailed description of the image (represented by an image descriptor which represents different features in the input image).

In the example training mode of FIG. 1A, the CNN 102 is trained based on multiple retail product tag images per retailer category to classify each retail product tag image correctly according to corresponding product promotion type. The example CNN 102 of the apparatus 100 includes an example feature extractor 106 and an example classifier 122. The example apparatus 100 further includes an example retail product tag image database 104, an example image descriptor database 110, an example seed generator 112, an example category signature generator 114, an example feature descriptor generator 118, an example retailer ID extractor 126, an example category signature mapper 130, and an example category signature database 132.

In the illustrated example, the example apparatus 100 is provided with the feature extractor 106 to obtain retail product tag images from the retail product tag image database 104. The example feature extractor 106 analyzes the images received from the retail product tag image database 104 and extracts particular features of the retail product tag image that make it different relative to a different retail product tag image. For example, the example feature extractor 106 uses the convolution, non-linearity operations, and pooling, discussed above. The convolution layer includes a set of filters that convolve over the retail product tag image. The filters are weighted matrices in which the weights in the matrices, originally based on pre-determined values, are adjusted in the training mode during backpropagation of the classification operation of the example apparatus 100. The matrices include specified pixel values to extract the particular features of the retail product tag image (e.g., a rounded edge, a color, a character, a logo, etc.) of the target retailer category under analysis. For example, the received retail product tag image may be a [5×5] matrix of pixels arranged in an order that describes the shape, color, size, etc. of the retail product tag image. The example filter may be a [3×3] weighted matrix that convolves (e.g., slides) across the width and the height of the input retail product tag image so that all pixels of the input image are processed at least once (e.g., by one pixel) by the filter. During convolution, the filter generates an output matrix that includes rows and columns of elements (e.g., matrix values) corresponding to pixels of the input image. In the example, the feature extractor 106 computes each element of the output matrix for a corresponding position of the filter during convolution. When the feature extractor 106 applies the example [3×3] filter to the input retail product tag image, the filter processes a [3×3] section of the input retail product tag image pixel values. The pre-determined pixel values of the [3×3] filter and the pixel values of the input image section that is processed is multiplied and the total number added to produce a single element of the processed section. In this manner, the feature extractor 106 generates an output of the final product as a [3×3] matrix of the computed elements of the processed section of the input image. In some examples, the feature extractor 106 includes filters with a plurality of different weighted matrices to extract a plurality of different features of the input image.

In some examples, the pooling layer processes the input data after the non-linearity and convolution layer. The example feature extractor 106 uses the pooling layer to downsample the final computed matrices of the retail product tag image to reduce the spatial size of the image. For example, if there were ten [3×3] filters applied to the [5×5] target retail product tag image, there would be ten [3×3] output products of the retail product tag image. The feature extractor 106 uses downsampling to reduce the size of the output products of the retail product image for processing, while maintaining the pertinent information regarding the input images in each output product. In some examples, the feature extractor 106 uses max pooling, average pooling, or L2 pooling techniques to downsample.

The example feature extractor 106 generates the example image descriptor 108 after the pooling operation described above. An image descriptor 108 is a compact representation of the retail product tag image that includes feature values corresponding to the strengths of features detected in the retail product tag image. In the illustrated example, the feature extractor 106 transforms the input image to a one-dimensional array to form the length of the image descriptor 108. As used herein, the length of the image descriptor 108 is a one-dimensional array of size m, where m represents a number of feature values for corresponding features evaluated in an input retail product tag image. An example size m of the image descriptor 108 may be 0.4, 0.2, 00.03, etc. For example, the length of the image descriptor 108 depends on the size of the retail product tag image in pixels and the architecture of the CNN 102. In some examples, the size of the retail product tag image is fixed (e.g., the retail product tag images are rescaled to a size of 20×20 pixels). As used herein, the architecture of the example CNN 102 is defined as the types of techniques used in three of the four main operations of the CNN 102 (e.g., the convolution operation, the non-linearity operation, and the pooling or sub-sampling operation) to define the final length of the example image descriptor 108. For examples in which a retail product tag image is a size of [20×20] pixels and the architecture of the CNN 102 includes two sub-sampling operations, each sub-sampling operation to reduce the size of the image by half. In this example, the first sub-sampling operation sub-samples and reduces the retail product tag image of [20×20] pixels to [10×10] pixels, and the second sub-sampling operation reduces the retail product tag image of [10×10] pixels to [5×5] pixels. The example image descriptor 108 is flattened to a length of an array of [1×25]. As used herein, flattening a matrix is defined as multiplying the number of rows by the number of columns. In the illustrated example 100, the feature extractor 106 stores the image descriptor 108 in the image descriptor database 110. For example, if the example feature extractor 106 receives 1000 images, it will generate 1000 image descriptors and 1000×m values and store the 1000 image descriptors in the image descriptor database 110.

The example apparatus 100 is provided with the example retailer ID extractor 126 to extract retail product tag metadata from input image data (e.g., retail product tag images) stored in the retail product tag image database 104. The metadata of the retail product tag image identifies the retailer category of the retail product tag image. The example retailer ID extractor 126 stores the extracted metadata as the retailer ID 128 for the retailer category of the retail product tag image in the image descriptor database 110.

The example image descriptor database 110 stores all computed image descriptors in association with corresponding retailer IDs 128 provided by the example retailer ID extractor 126. The example image descriptor database 110 notifies the example seed generator 112 when the example feature extractor 106 computes image descriptors for one or more available retail product tag images of one or more retailer categories.

The example apparatus 100 is provided with the example seed generator 112 to generate a random seed per category for subsequent use by the category signature generator 114 to generate a Gaussian probability distribution function (PDF) of image descriptors 108 for a corresponding category. As described below, the category signature generator 114 uses the Gaussian PDF to generate a category signature 116 for that category. The example seed generator 112 could be implemented by a random-number generator or a pseudo-random number generator to generate unique random seeds for each category so that unique category signatures 116 can be generated for each category. For example, the seed generator 112 uses the retailer ID 128 to seed the random-number generator or pseudo-random number generator which generates a seed that corresponds to the retailer ID 128 of a corresponding retailer category. In some examples, the seed generator 112 may not employ a random or pseudo random number generator and instead generate the seed as a replication of the retailer ID 128. The example seed generator 112 stores the unique seed in a memory (e.g., in the image descriptor database 110 and/or the category signature database 132). In this manner, the category signature generator 114 can use the stored seed at any subsequent time to re-generate the category signature 116 for the corresponding category should the category signature 116 be lost or destroyed.

The example apparatus 100 is provided with the category signature generator 114 to generate category signatures 116 based on seeds generated by the seed generator 112 and image descriptors 108. For example, for a retailer category, the category signature generator 114 obtains multiple image descriptors 108 from the image descriptor database 110 to generate a Gaussian probability density function (PDF) 140 based on the multiple image descriptors 108. As used herein, a PDF is a distribution of probabilities of occurrence of different detected visual features across multiple retail product tag images for a particular category. For example, the feature extractor 106 computes 1000 image descriptors 108 and 1000×m values for 1000 retail product tag images of a first retailer category. Each image descriptor 108 includes a matrix of pixels of a particular size with which to determine the unique features of the retail product tag images. The example category signature generator 114 generates a Gaussian PDF 140 based on the probabilities that multiple features are detected in the input images for the retailer category. The Gaussian distribution generated by the category signature generator 114 estimates the mean and variance of the magnitudes of the PDF. For example, the Gaussian distribution is a bell-shaped curve that is symmetric about the mean of the PDF and obtains its maximum value (e.g., the value on the x-axis that is closest to the probability of 1).

Figure 1B:
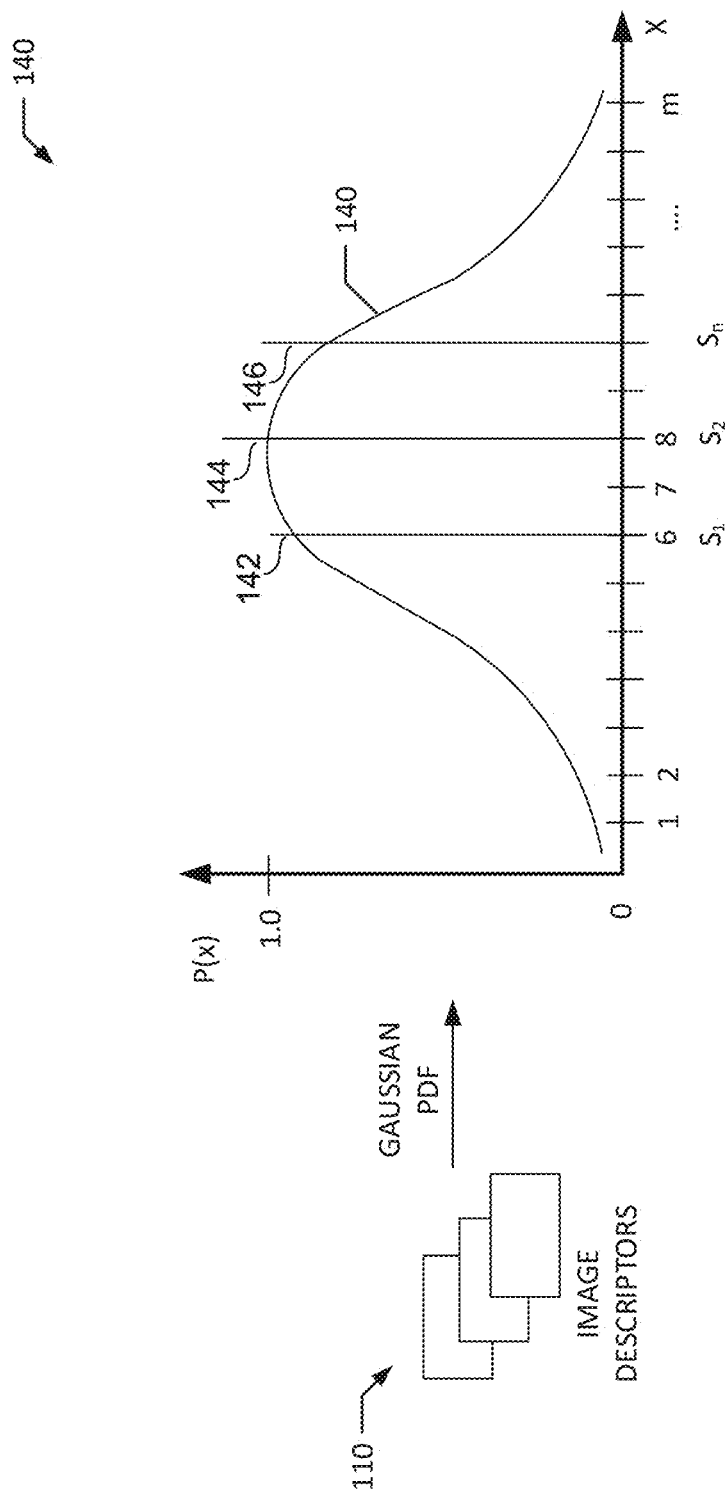
FIG. 1B illustrates an example probability distribution generated by example category signature generator of FIG. 1A in accordance with teachings of this disclosure.

Referring to FIG. 1B, an example Gaussian PDF 140 is shown of a probability distribution generated by the example category signature generator 114. In the example Gaussian PDF 140, the x-axis represents positions (m) of probability values that represent different features in input data (e.g., retail product tag images). The y-axis of the example Gaussian PDF 140 represents probabilities "P(x)" (from 0 to 1.0) that each feature "x=m" is present in the input data. The example Gaussian PDF 140 shows multiple samples $S_1$-$S_n$ of features corresponding to different probabilities P(x) on the Gaussian PDF 140. For example, each sample $S_n$ is a numeric value (e.g., a bit value) representing a corresponding feature x in the input data.

The category signature generator 114 generates the category signature 116 by sampling the Gaussian PDF 140 to obtain a quantity of n samples $S_n$ for use to generate the category signature 116. In some examples, the category signature generator 114 draws the n samples from the Gaussian PDF 140 (e.g., selects ones of the positions of the probability values of the Gaussian PDF 140) from a range or group of features having the highest probabilities of occurrence. For example, $S_1$ 144, $S_2$ 146, and $S_n$ 148 are all example samples corresponding to features m having highest probabilities of occurring in the retail product tag of a retailer category. In this example, n represents a number of samples equal to the length of the category signature 116. For example, the category signature 116 may be a [1×25] matrix of samples, in which the "25" in the matrix represents the length or quantity n of samples.

Referring again to FIG. 1A, since the input data is a group of image descriptors 108 from the image descriptor database 110 for retail product tag images of the same retailer category, the Gaussian PDF 140 of the image descriptors 108 will be in the same numeric range as the feature values of each individual image descriptor 108 for the same retailer category. In addition, the resulting category signature 116 based on the Gaussian PDF 140 is in the same numeric range as the image descriptors 108 of retail product tags for the same retail category.

In the illustrated example, the example category signature generator 114 provides the category signature 116 to the feature descriptor generator 118. In the illustrated example, the feature descriptor generator 118 obtains the image descriptor 108 of the same retailer category from the example feature extractor 106 and/or the example image descriptor database 110. The example feature descriptor generator 118 generates a feature descriptor 120 based on the image descriptor 108 and the category signature 116. For example, the feature descriptor generator 118 concatenates the matrix (e.g., a [1×25] matrix) that forms the image descriptor 108 and the matrix (e.g., a [1×25] matrix) that forms the category signature 116. In this manner, the feature descriptor 120 is twice the length (e.g., a [1×50] matrix) of the image descriptor 108.

As described above, the numeric range of values in the category signature 116 is the same range as values in the image descriptor 108. Keeping the values in the category signature 116 and the values in the image descriptor 108 in the same numeric range is useful to facilitate the classifier 122 to properly process the resulting feature descriptor 120. That is, values for the example category signature 116 that are not commensurate in numeric range with the values of the image descriptor 108 decreases the accuracy of the CNN 102. For example, the recognition sensitivity of the CNN 102 to features in the numeric range of values in the image descriptor 108 is decreased if the values of the category signature 116 are outside that numeric range because the filters of the feature extractor 106 would need to adapt to process the larger of numeric values of the category signature 116, thereby decreasing the sensitivity of the CNN 102 to the features of a retail product tag image represented by values of a smaller numeric range.

The apparatus 100 is provided with the example classifier 122 to classify the provided feature descriptor 120 (e.g., determines output probabilities of feature descriptors 120 for different classes). During training, the example classifier 122 generates multiple outputs over multiple iterations until the feature recognition of the classifier 122 improves such that the output of the classifier 122 is acceptable in correctly classifying input images of retail product tags. For example, the classifier 122 illustrated in the CNN 102 may initially output unacceptable probabilities for two classes (e.g., promotional product tag types such as a multi-buy promotional product tag, a price reduction promotional product tag, etc.) of the feature descriptor 120 at the beginning of a training phase. After multiple training iterations and backpropagation (e.g., corrective feedback) based on the one or more training retail product tag images, the example classifier 122 outputs probabilities of promotional product tag types that are acceptable. An algorithm is used to calculate the total error at the output of the classifier 122 (e.g., a summation over the two classes). Backpropagation is then used to calculate gradients of the error with respect to all weights (e.g., the filters used during the convolution operation) in the CNN in training mode 102. After backpropagation of the output probabilities, the weights in the filters of the feature extractor 106 are adjusted (e.g., the [3×3] matrix of pixel values that represent a filter of the feature extractor 106 may be rearranged, adjusted, removed, etc.) to help better predict the class of the feature descriptor 120.

The apparatus 100 is provided with the example category signature mapper 130 to map the retailer ID 128 of a retailer category with the category signature 116 for that retailer category. For example, the category signature mapper 130 stores the category signature 116 in association with the retailer ID 128 (e.g., in a same mapping record in the example category signature database 132) to establish a correspondence between the two items of information.

The apparatus 100 is provided with the example category signature database 132 to store the category signatures that are mapped with their corresponding retailer IDs. For example, the category signature mapper 130 may provide the mapped category signature 116 and retailer ID 128 to the category signature database 132 for storing in a corresponding mapping record.

FIG. 2 is a block diagram of the example apparatus 100 of FIG. 1A operating in a recognition mode. The example apparatus 100 of FIG. 2 may be implemented using the CNN 102 after the training mode of FIG. 1. In the recognition mode of FIG. 2, the CNN 102 classifies a retail product tag.

In some examples, during the recognition mode, the CNN 102 is used to classify retail product tags in real time as images of these product tags are captured by a device (e.g., a mobile phone, a tablet device, a digital still camera, etc.). In other examples, the CNN 102 is used to classify retail product tags during a post process during some later time after multiple images of multiple retail product tags have been captured and stored. In any case, the CNN 102 may be implemented by the same device that captured the images or by a separate device that obtains the images from the capture device. In the example recognition mode of FIG. 2, the CNN 100 has been trained to classify input retail product tag images from a plurality of retailer categories and output probability values indicative of the input retail product tag images corresponding to different types of retail product tags. The example apparatus 100 includes the example feature extractor 106, the example retailer ID extractor 126, the example category signature database 132, the example feature descriptor generator 118, and the example classifier 122. In the illustrated example, the apparatus 100 generates an example first output probability value 210 from zero to one (e.g., one being the highest likelihood) that an input retail product tag corresponds to a first type of promotional product tag. The example apparatus 100 also generates an example output probability 212 value that represents a likelihood from zero to one (e.g., one being the highest likelihood) that an input retail product tag corresponds to a second type of retail product tag.

The apparatus 100 of FIG. 2 is provided with the example retailer categories 202. The retailer categories 202 may be identified in images based on retailer category metadata (e.g., data and/or information that can be used to identify a retailer category). The example retailer categories 202 are identified by their fill type (e.g., slanted lines, checkered lines, diamond shaped lines, etc.). For example, the slanted lines of retailer category 1 may represent the metadata of a large corporate department store, the checkered lines of retailer category 2 may represent the metadata of a mom and pop shop, the diamond shaped lines may represent the metadata of a chain of stores owned by a same business entity, etc.

The example apparatus 100 in the recognition mode of FIG. 2 begins when the example apparatus 100 obtains a retail product tag image 204 from the retail product tag image database 104. In the recognition mode of FIG. 2, the apparatus 100 is to determine whether the retail product tag image 204 corresponds to a first type of retail product tag or a second type of retail product tag. In the illustrated example of FIG. 2, the apparatus 100 processes a retail product tag image from category 1. However, the same techniques disclosed may be used to classify product tag images from any category.

The apparatus 100 is provided with the example retailer ID extractor 126 to retrieve the retailer ID (e.g., the retailer ID 128 of FIG. 1) from metadata of the retail product tag image 204. The example apparatus 100 is also provided with the category signature database 132 to provide the category signatures for the retailer categories (e.g., the category signature 116 generated in the apparatus 100 in training mode of FIG. 1). For example, the retailer ID extractor 126 may provide the retailer ID 128 corresponding to the retail product tag image 204 to the category signature database 132. The example category signature database 132 may use the retailer ID 128 to scan a lookup table in the category signature database 132 that has mapped a category signature with the retailer ID 128.

The apparatus 100 is provided with the example feature extractor 106 to generate an image descriptor 216 representative of the retail product tag image 204. The image descriptor 216 includes feature values corresponding to the strengths of features detected in the retail product tag image 204. The image descriptor 216 is similar in structure to the image descriptor 108 of FIG. 1. In some examples, the feature extractor 106 analyzes the retail product tag image 204 and extracts particular features of the image 204 that, for example, differ from features of a different retail category product tag image of the same or different retailer category. Example operations of the feature extractor 106 to generate the example image descriptor 216 are described above in connection with FIG. 1. The feature extractor 106 of FIG. 2 utilizes filters that are weighted to allow the example classifier 122 to generate probability values indicative of likelihoods of different types of retail product tags. For example, the feature extractor 106 may generate an image descriptor 216 using filters of the same size (e.g., a [3×3] filter) but with different pixel values corresponding to the retail product tag image 204. As described in the above examples and to facilitate further description of the disclosed examples, the example image descriptor 216 of FIG. 2 is referred to as a one dimensional array of size [1×10].

The apparatus 100 is provided with the example feature descriptor generator 118 to generate a feature descriptor 218 corresponding to the retail product tag image 204 of a retailer category by concatenating the image descriptor 216 and the category signature 116. For example, the feature descriptor generator 118 obtains the category signature 116 of the retailer corresponding to the retail product tag image 204 from the category signature database 132 and obtains the image descriptor 216 of the retail product tag image 204 from the feature extractor 106. In the illustrated example, the example category signature database 132 provides the category signature 116 to the example feature descriptor generator 118 when it has determined the category signature 116 corresponding to the retailer ID 128 from the retailer ID extractor 126 that was mapped and stored by the category signature mapper 130 of the apparatus 100 of FIG. 1. In the illustrated example, the feature descriptor 218 is similar in structure to the feature descriptor 120 of FIG. 1.

In the illustrated example, the feature descriptor generator 118 generates the feature descriptor 218 to be twice the bit length of the image descriptor 216. For example, the image descriptor 216 is an array of size [1×25] and the example category signature 116 associated with the category of the image descriptor 108 is also an array of size [1×25]. The example feature descriptor generator 118 concatenates the two arrays corresponding to the image descriptor 216 and the category signature 116 to generate the feature descriptor 218. The resulting feature descriptor 218 is a size [1×50].

The example feature descriptor 218 includes data to facilitate properly classifying the retail product tag image 204 by the classifier 122 into a correct class type of retail product tag. The example classifier 122 receives the feature descriptor 218 and outputs a probability value indicative of a class corresponding to the retail product tag image 204.

The example classifier 122 is a non-linear model. The example classifier 122 uses a logistic regression with cost functions to generate the non-linear model. That is, the classifier 122 uses such logistic regression with cost functions to classify the example feature descriptor 218. Logistic regression is a classification algorithm used to assign observations to a discrete set of classes. Logistic regression transforms its output using the logistic sigmoid function to return a probability value which can then be mapped to two or more discrete classes. The logistic sigmoid function is a mathematical function that has an input of a real value and outputs another value between 0 and 1, and the output function is non-linear. In some examples, the classifier 122 utilizes this function because the output probability needs to be between 0 and 1. In the illustrated example of FIG. 2, the output probability value 210 that the retail product tag image 204 is a first type of retail product tag is 0.81 and the probability value 212 that the retail product tag image 204 is a second type of retail product tag is 0.19. Therefore, it is more likely that the class of the retail product tag image 204 is a first type of retail product tag, because the output probability of 0.81 is closer to 1 than the output probability of 0.19 of the example second type of retail product tag.

The apparatus 100 is provided with the example report generator 222 to generate a report based on the classification results provided by the output probability values 210 and 212. For example, the report generator 222 displays the report to a user, uses the report to determine the price of a product requested by a customer, updates the product prices in a retailer sore and/or website, etc. In some examples, the report generator 222 may be a separate entity of the CNN 102, a computer process, etc.

While an example manner of implementing the apparatus 100 of FIG. 1A is illustrated in FIGS. 1A and 2, one or more of the elements, processes and/or devices illustrated in FIGS. 1A and 2 may be combined, divided, re-arranged, omitted, eliminated and/or implemented in any other way. Further, the example CNN 102, the example retail product tag image database 104, the example feature extractor 106, the example image descriptor database 110, the example seed generator 112, the example category signature generator 114, the example feature descriptor generator 118, the example classifier 122, the example retailer ID extractor 126, the example category signature mapper 130, the example category signature database 132, and/or, more generally, the example apparatus 100 of FIGS. 1A and 2 may be implemented by hardware, software, firmware and/or any combination of hardware, software and/or firmware. Thus, for example, any of the example CNN 102, the example retail product tag image database 104, the example feature extractor 106, the example image descriptor database 110, the example seed generator 112, the example category signature generator 114, the example feature descriptor generator 118, the example classifier 122, the example retailer ID extractor 126, the example category signature mapper 130, the example category signature database 132 and/or, more generally, the example apparatus 100 could be implemented by one or more analog or digital circuit(s), logic circuits, programmable processor(s), programmable controller(s), graphics processing unit(s) (GPU(s)), tensor processing unit(s) (TPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example CNN 102, the example retail product tag image database 104, the example feature extractor 106, the example image descriptor database 110, the example seed generator 112, the example category signature generator 114, the example feature descriptor generator 118, the example classifier 122, the example retailer ID extractor 126, the example category signature mapper 130, and/or the example category signature database 132 is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 100 of FIGS. 1A and 2 may include one or more elements, processes and/or devices in addition to, or instead of, those illustrated in FIGS. 1A and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
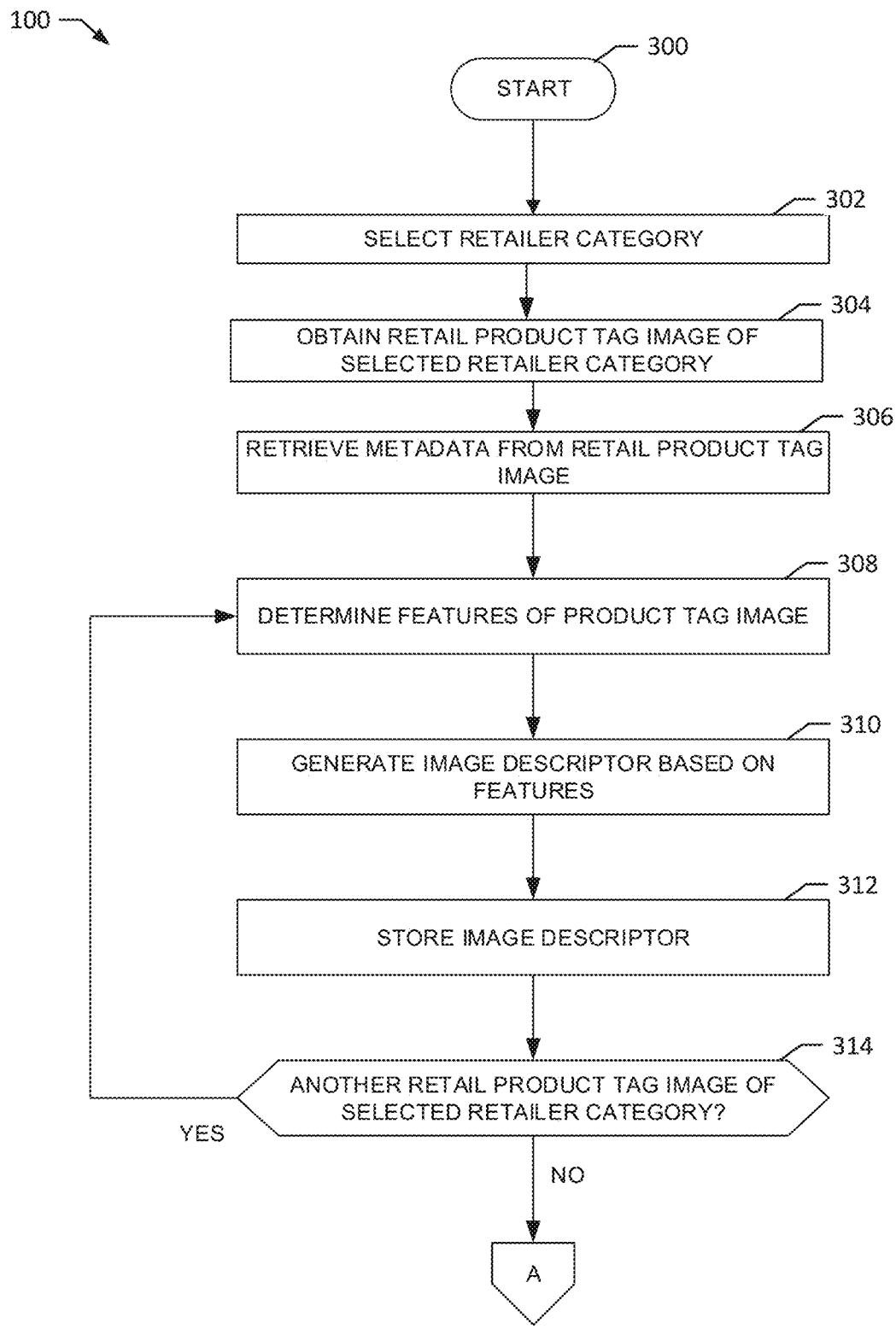
FIGS. 3A and 3B depict a flowchart representative of machine readable instructions which may be executed to implement the example apparatus of FIGS. 1A and 2 to operate in the training mode.
Figure 3B:
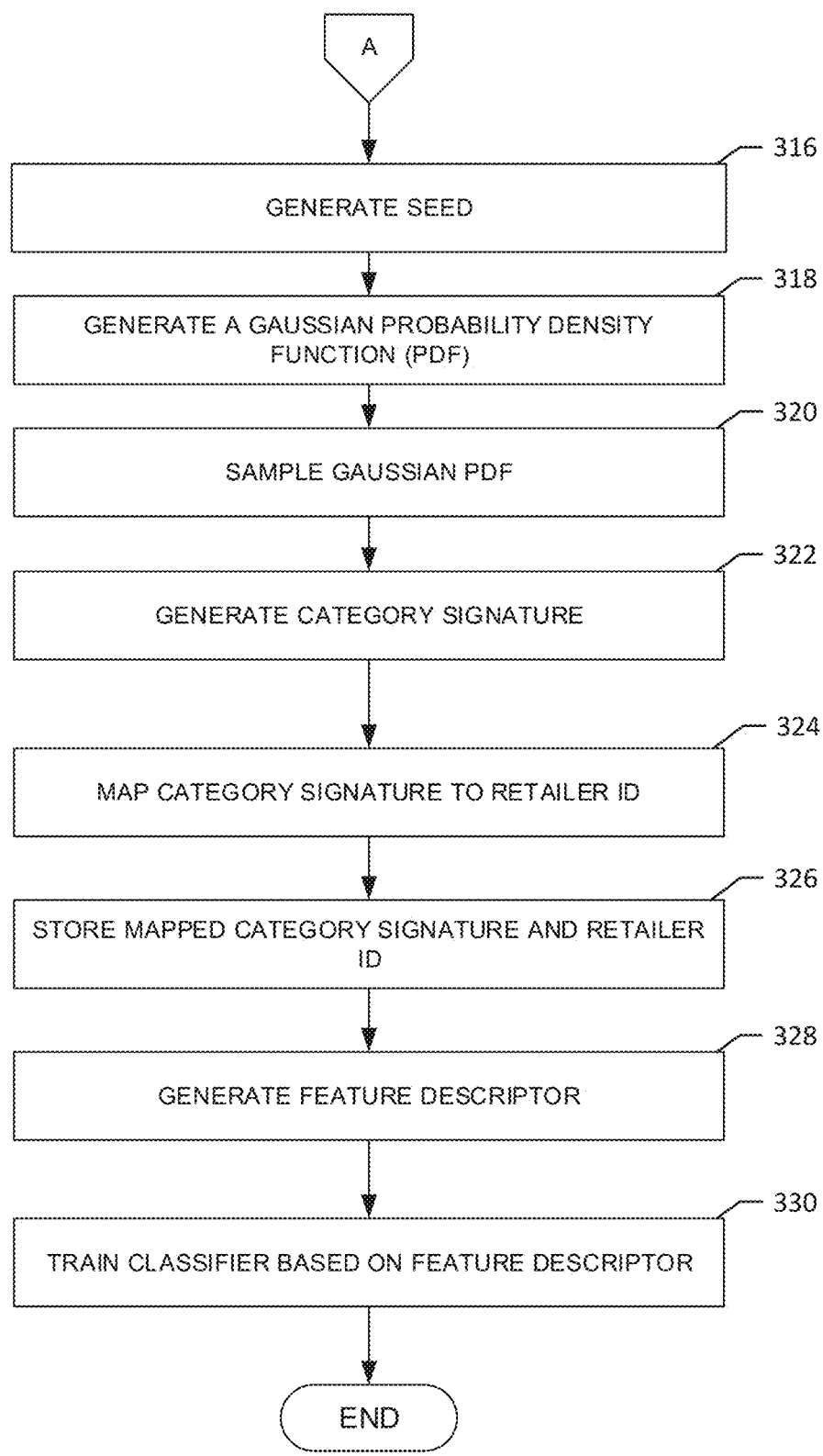
Figure 4A:
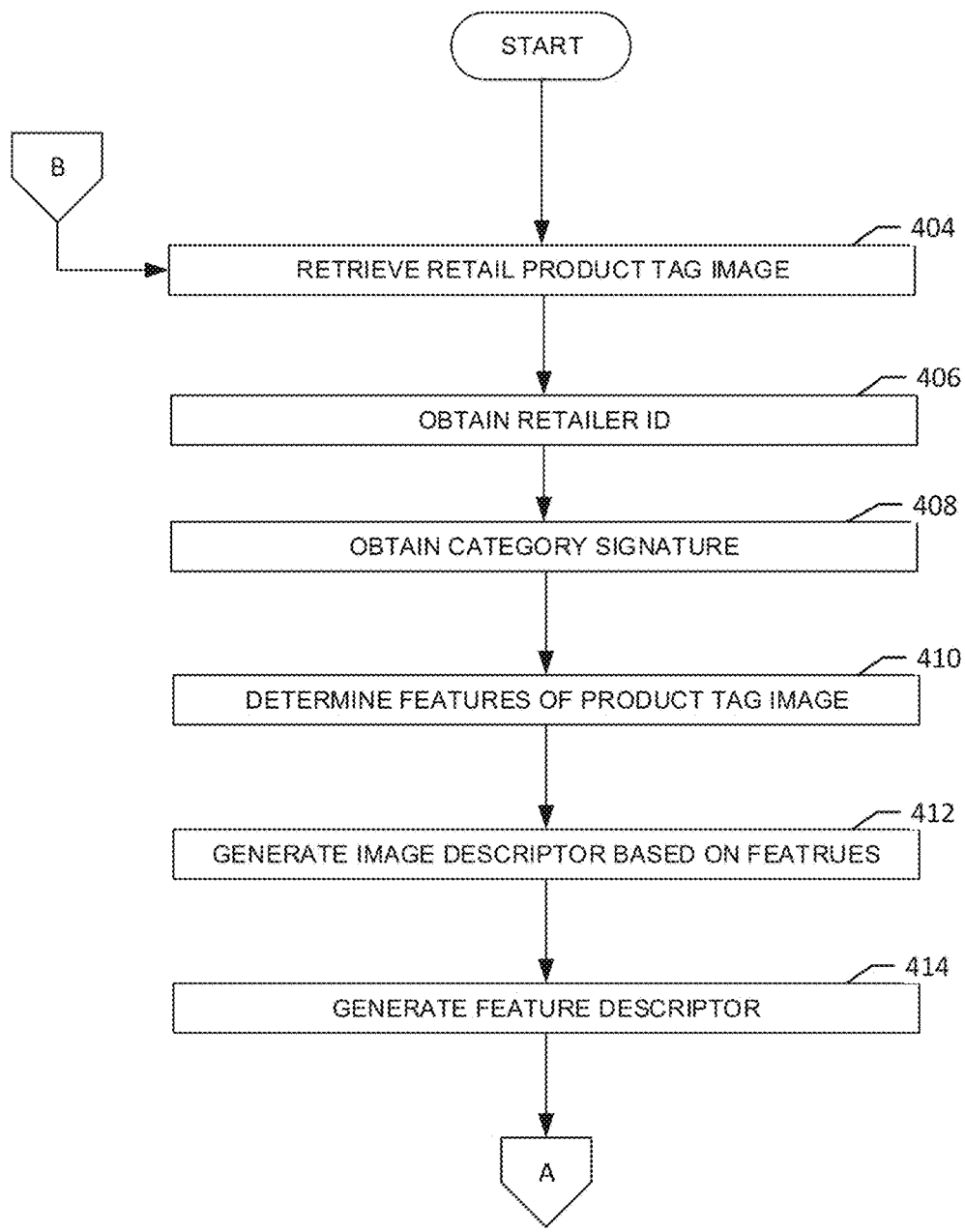
FIGS. 4A and 4B depict flowcharts representative of machine readable instructions which may be executed to implement the example apparatus of FIGS. 1A and 2 to train the CNN in the recognition mode of FIG. 1.
Figure 4B:
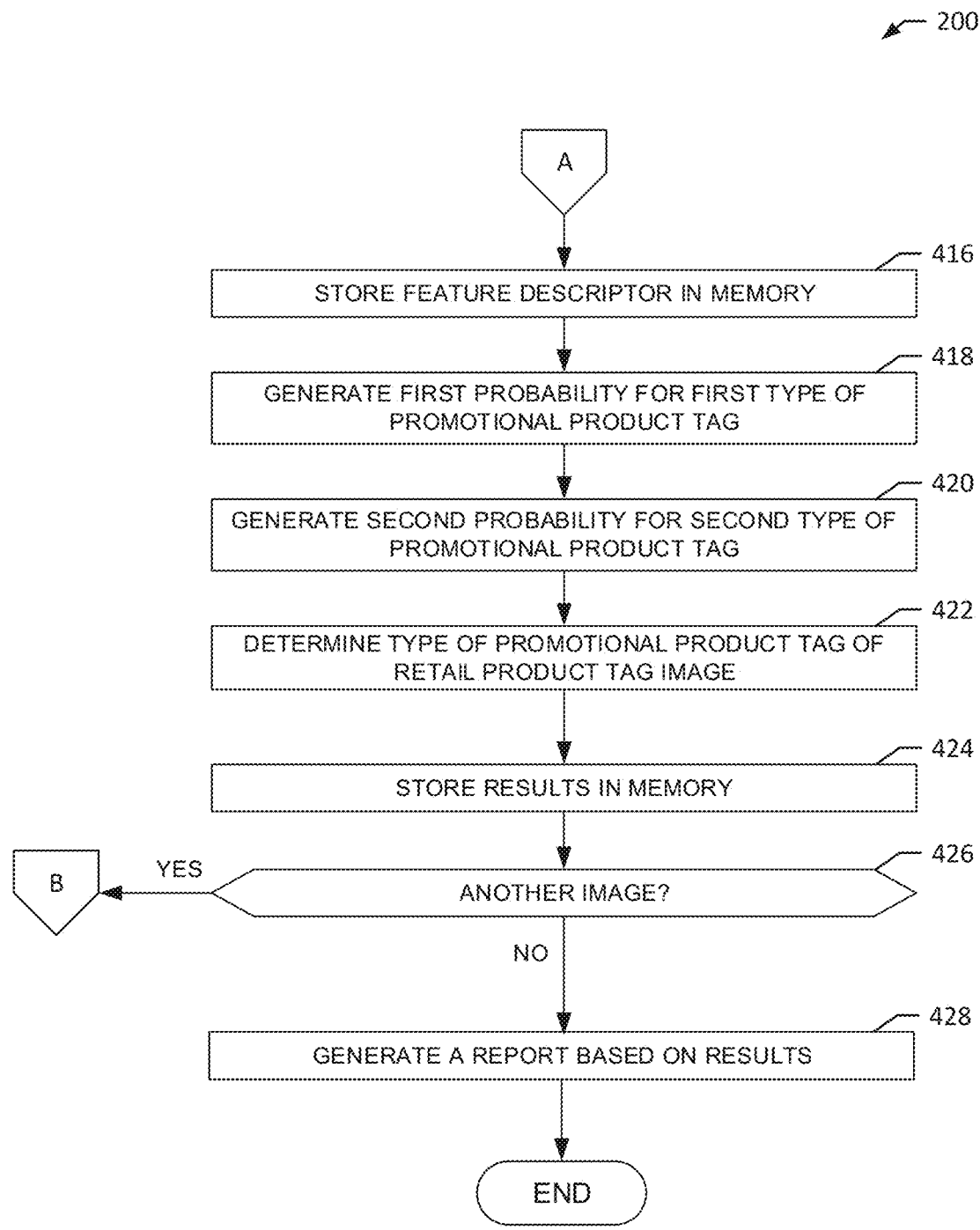

A flowchart representative of example machine readable instructions for implementing the example apparatus 100 in the training mode of FIG. 1A is shown in FIGS. 3A and 3B, and a flowchart representative of example machine readable instructions for implementing the example apparatus 100 operating in the recognition mode of FIG. 2 is shown in FIGS. 4A and 4B. The machine readable instructions may be one or more executable program(s) or portion(s) of one or more executable program(s) for execution by a computer processor such as the processor 512 shown in the example processor platform 500 discussed below in connection with FIG. 5. The program(s) may be embodied in software stored on a non-transitory computer readable storage medium such as a CD-ROM, a floppy disk, a hard drive, a DVD, a Blu-ray disk, or a memory associated with the processor 512, but the entirety of the program(s) and/or parts thereof could alternatively be executed by a device other than the processor 512 and/or embodied in firmware or dedicated hardware. Further, although the example program(s) is/are described with reference to the flowcharts illustrated in FIGS. 3A, 3B, 4A, and 4B, many other methods of implementing the example apparatus 100 in the training mode of FIG. 1A and the example apparatus 100 in the recognition mode of FIG. 2 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3A, 3B, 4A, and 4B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The training program of FIGS. 3A and 3B begins at block 302 (FIG. 3A) at which the example apparatus 100 selects a retailer category to train the CNN 102 (FIG. 1A) to classify retail product tag images of the selected retailer category. The example apparatus 100 obtains a retail product tag image of the selected retailer category (block 304). For example, the retailer ID extractor 126 and the feature extractor 106 of FIG. 1A obtain the retail product tag image from the example retail product tag image database 104 (FIG. 1A). The example retailer ID extractor 126 retrieves metadata from the retail product tag image (block 306). For example, the extracted metadata is the retailer ID 128 (FIG. 1A) indicative of the retailer category.

The example feature extractor 106 then determines the features of the retail product tag image (block 308). In some examples, the feature extractor 106 utilizes a convolution operation plus a max pooling operation to determine the features of the product tag image. In the illustrated example, the operation of block 308 is executed once, twice, or a plurality of times for any number of features that may be present in the input image. The feature extractor 106 generates an image descriptor 108 (FIG. 1A) based on the features (block 310).

The example feature extractor 106 stores the example image descriptor 108 in the image descriptor database 110 (block 312). The example apparatus 100 determines if there is another retail product tag image of the selected retailer category to be analyzed (block 314). For example, the feature extractor 106 or the retailer ID extractor 126 may query the retail product tag image database 104 to determine whether any retail product tag images remain to be processed. If there is another retail product tag image to process, control returns to block 308. In this manner, multiple iterations of blocks 308, 310, 312, 314 can be performed until all or multiple (e.g., a sufficient quantity for satisfactory training of the CNN 102) of the retail product tag images in the retail product tag image database 104 for the selected retailer category have been processed for training.

Turning to FIG. 3B, the example seed generator 112 generates a seed (block 316). The example category signature generator 114 generates a Gaussian probability density function (PDF) 140 (block 318). For example, the category signature generator 114 is seeded with the seed generated at block 316 to generate a Gaussian distribution of a PDF 140 of the image descriptors 108 stored in the image descriptor database 110 for the selected retailer category.

The example category signature generator 114 (FIG. 1A) samples the Gaussian PDF 140 (block 320). For example, the category signature generator 114 selects n samples from the Gaussian PDF 140 as described above in connection with FIG. 1B. The example category signature generator 114 may utilize sampling by random node selection, sampling by random edge selection, sampling by exploration, and/or any one or more of other different types of sampling methods to perform the process of block 320. The example category signature generator 114 generates the category signature 116 (FIG. 1A) (block 322). For example, the category signature generator 114 generates the example category signature 116 based on the n samples as an array of size n, where n represents the number of samples drawn from the Gaussian PDF 140.

The example category signature mapper 130 maps the category signature 116 to the retailer (block 324) of the retailer category. For example, the category signature mapper 130 obtains the generated category signature 116 from the category signature generator 114 and obtains the example retailer ID 128 of the selected retailer category from the example retailer ID extractor 126. The example category signature mapper 130 stores the mapped category signature 116 and the retailer ID 128 (block 326) in the example category signature database 132. For example, the category signature mapper 130 stores the category signature 116 in association with the retailer ID 128 in a mapping record in the category signature database 132.

The example feature descriptor generator 118 (FIG. 1A) generates a feature descriptor 120 (block 328). For example, the example feature descriptor 120 (FIG. 1A) concatenates the example category signature 116 and the example image descriptor 108 to form the feature descriptor 120 as an array twice the size of the example image descriptor 108.

The example classifier 122 (FIG. 1A) of the CNN 102 is trained based on the feature descriptor 120 (block 330). For example, the processor 512 (FIG. 5) may train the classifier 122 to output correct probabilities via backpropagation. Backpropagation is used to calculate gradients of an error with respect to all weights (e.g., the filters used during the convolution operation) in the apparatus 100 in training mode. After backpropagation of the output probabilities, the weights in the filters of the classifier 122 are adjusted until the errors corresponding to the weights are reduced to an acceptable minimum error value (e.g., below a threshold). The examples process of FIGS. 3A and 3B then ends.

In some examples, the processes of FIGS. 3A and 3B may be repeated a plurality of times for the same retailer category and/or different retailer categories. The processes may be repeated a plurality of times until the CNN 102 in training mode has been trained to output acceptable probabilities (e.g., based on acceptable validation results) for each class of each retailer category.

The recognition program of FIGS. 4A and 4B begins at block 404 (FIG. 4A) at which the example apparatus 100 obtains a retail product tag image 204 (block 404). For example, the retailer ID extractor 126 and the feature extractor 106 of FIG. 2 obtain the retail product tag image 204 from the example retail product tag image database 104 (FIG. 2).

The example retailer ID extractor 126 obtains a retailer ID (block 406). For example, the retailer ID extractor 126 retrieves a retailer ID as metadata from the retail product tag image. The retail ID is indicative of a retailer category for which to obtain a category signature 116 from the example category signature database 132. The example feature descriptor generator 118 obtains the category signature 116 (block 408). For example, the feature descriptor generator 118 obtains the category signature 116 from the category signature database 132 based on the retailer ID.

The example feature extractor 106 determines the features of the retail product tag image 204 (block 410). In some examples, the feature extractor 106 utilizes the convolution operation plus the pooling operation to compute the features from the retail product tag image 204. In some examples, this operation is executed once, twice, or a plurality of times for one or more features that may be present in the retail product tag image 204. The example feature extractor 106 generates an image descriptor 216 based on the features (block 412).

The example feature descriptor generator 118 (FIG. 2) generates a feature descriptor 218 (block 414) based on the category signature 116 and the image descriptor 216. For example, the feature descriptor generator 118 generates the example feature descriptor 218 (FIG. 2) by concatenating the example category signature 116 with the example image descriptor 216. The example feature descriptor 218 (FIG. 2) is an array twice the size of the example image descriptor 216.

The example feature descriptor generator 118 stores the feature descriptor 218 in a memory (block 416). For example, the feature descriptor generator 118 provides the feature descriptor 218 to a memory that is accessible by the classifier 122 (FIG. 2). In some examples, the memory is implemented by one or more of the local memory 513, the volatile memory 514, the non-volatile memory 516, or the mass storage 528 of FIG. 5.

The example classifier 122 generates a first probability for a first type of promotional product tag (block 418). The example classifier generates a second probability for a second type of promotional product tag (block 420). For example, the example classifier 122 outputs probabilities for two classes, which include a multi-buy retail product tag and a price reduction retail product tag. For example, the classifier 122 may utilize a logistic regression function as described above to determine the probability values.

Based on the probability values from the logistic regression function, the example classifier 122 determines the type of promotional price tag of the retail product tag image (block 422). For example, the example classifier 122 outputs a probability value 210 (FIG. 2) of 0.81 for a first type of promotional product tag and a probability value 212 (FIG. 2) of 0.19 for a second type of promotional product tag. Based on such example probabilities, it is most likely that the class of the retail product tag image 204 is a first type of promotional product tag, because the output probability of 0.81 of the example first type of promotional product tag is closer to the value of 1 than the output probability value of 0.19 of the example second type of promotional product tag. The example classifier 122 stores the output results (block 424). For example, the classifier 122 stores the probabilities in memory in association with the retail product tag image and/or in association with an identifier (e.g., a file name) of the retail product tag image. The apparatus 100 determines if there is another retail product tag image to analyze (block 426). For example, the apparatus 100 queries the retail product tag image database 104 for any other retail product tag image to be analyzed.

If the example apparatus 100 determines that another product tag image is to be analyzed, control returns to block 404 in FIG. 4A. In this manner, multiple iterations of blocks 404, 406, 408, 410, 412, 414, 416, 418, 420, 422, and 424 can be performed. If another product tag image is not available to be analyzed, the example report generator 222 (FIG. 2) generates a report based on the classification results (block 428) of the analyzed retail product tag images. For example, report generator 222 displays the report to a user, who uses the report to determine the price of a product requested by a customer, updates the product prices in a retailer sore and/or website, etc.

As mentioned above, the example processes of FIGS. 3A, 3B, 4A, and 4B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
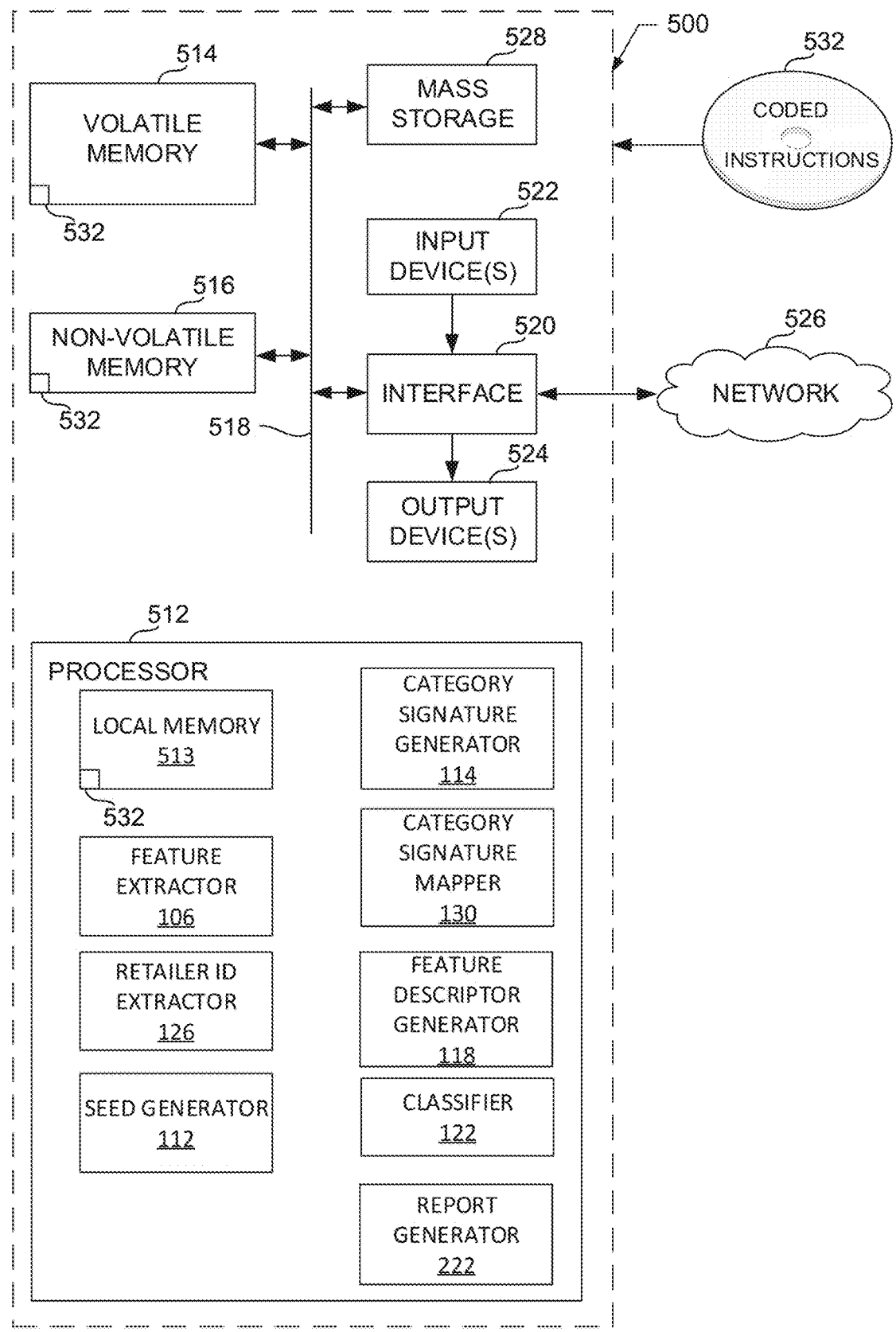
FIG. 5 is a block diagram of an example processing platform structured to execute the instructions of FIGS. 3A, 3B, 4A, and 4B to implement the example apparatus of FIGS. 1A and 2 to train a CNN and classify retail product tags using the trained CNN and a category signature.

FIG. 5 is a block diagram of an example processor platform 500 structured to execute the instructions of FIGS. 3A, 3B, 4A, and 4B to implement the apparatus 100 of FIGS. 1A and 2. The processor platform 500 can be, for example, a server, a personal computer, a workstation, a self-learning machine (e.g., a neural network processor), a mobile device (e.g., a cell phone, a smart phone, a tablet such as an iPad), a personal digital assistant (PDA), an Internet appliance, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the example feature extractor 106, the example retailer ID extractor 126, the example seed generator 112, the example category signature generator 114, the example category signature mapper 130, the example feature descriptor generator 118, the example classifier 122, and the example report generator 222.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3A-4B may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that improve the performance of a standard CNN by generating and using a category signature as an extra layer of information to help the CNN classify an inputted retail product tag image without needing multiple CNNs for different retailer categories and without needing user-input to identify a retailer category of an input retail product tag image during a recognition phase. In this manner, the disclosed methods, apparatus and articles of manufacture improve the efficiency of using a computing device by significantly reducing the number of CNNs and user-inputs needed to classify retail product tag images across a plurality of retailers. The disclosed methods, apparatus and articles of manufacture are accordingly directed to one or more improvement(s) in the functioning of a computer.

Example 1 is an apparatus to classify a retail product tag. The apparatus of Example 1 includes a feature extractor to generate a first image descriptor based on a first image of a first retail product tag corresponding to a first retailer category, the first image descriptor representative of one or more visual features of the first retail product tag; a feature descriptor generator to generate a feature descriptor corresponding to the first retail product tag by concatenating the first image descriptor and a first category signature corresponding to the first retailer category; and a classifier to: generate a first probability value corresponding to a first type of promotional product tag and a second probability value corresponding to a second type of promotional product tag based on the feature descriptor; and determine whether the first retail product tag corresponds to the first type of promotional product tag or the second type of promotional product tag based on the first probability value and the second probability value.

In Example 2, the subject matter of Example 1 can optionally include that the first retailer category is representative of a first retailer different from a second retailer that is represented as a second retailer category.

In Example 3, the subject matter of any one of Examples 1-2 can optionally include that the image descriptor is a one-dimensional array that includes feature values for corresponding features.

In Example 4, the subject matter of any one of Examples 1-3 can optionally include a retailer identifier extractor to extract retail product tag metadata from input image data.

In Example 5, the subject matter of any one of Examples 1-4 can optionally include a seed generator to generate a seed to generate a Gaussian probability density function of a plurality of image descriptors corresponding to the first retailer category.

In Example 6, the subject matter of any one of Examples 1-5 can optionally include that the seed generator is to generate the seed during a training phase, the training phase to be separate from a recognition phase during which the classifier determines whether the first retail product tag corresponds to the first type of promotional product tag or the second type of promotional product tag.

In Example 7, the subject matter of any one of Examples 1-6 can optionally include a category signature generator to generate the first category signature, the first category signature based on a seed and a plurality of image descriptors corresponding to second retail product tags of the first retailer category.

In Example 8, the subject matter of any one of Examples 1-7 can optionally include that the feature descriptor is a bit length twice the bit length of the first image descriptor.

In Example 9, the subject matter of any one of Examples 1-8 can optionally include a category signature mapper to store the first category signature in association with a retailer identifier corresponding to the first retailer category.

In Example 10, the subject matter of any one of Examples 1-9 can optionally include that the first type of promotional product tag is a multi-buy promotional product tag, and the second type of promotional product tag is a price reduction promotional product tag.

Example 11 is a non-transitory computer readable storage medium comprising instructions that, when executed, cause a processor at least: generate a first image descriptor based on a first image of a first retail product tag corresponding to a first retailer category, the first image descriptor representative of one or more visual features; generate a feature descriptor corresponding to the first retail product tag by concatenating the first image descriptor and a first category signature corresponding to the first retailer category; generate a first probability value corresponding to a first type of promotional product tag and a second probability value corresponding to a second type of promotional product tag based on the feature descriptor; and determine whether the first retail product tag corresponds to the first type of promotional product tag or the second type of promotional product tag based on the first probability value and the second probability value.

In Example 12, the subject matter of Example 11 can optionally include that the instructions, when executed, cause the processor to generate a seed to generate a Gaussian probability density function of a plurality of image descriptors corresponding to the first retailer category.

In Example 13, the subject matter of any one of Examples 11-12 can optionally include that the instructions, when executed, cause the processor to generate the seed during a training phase, the training phase to be separate from a recognition phase during which the classifier determines whether the first retail product tag corresponds to the first type of promotional product tag or the second type of promotional product tag.

In Example 14, the subject matter of any one of Examples 11-13 can optionally include that the instructions, when executed, cause the processor to generate a first category signature based on a seed and a plurality of image descriptors corresponding to second retail product tags of the first retailer category.

In Example 15, the subject matter of any one of Examples 11-14 can optionally include that the instructions, when executed, cause the processor to store in a memory the first category signature in association with a retailer identifier corresponding to the first retailer category.

In Example 16, the subject matter of any one of Examples 11-15 can optionally include that the instructions, when executed, cause the processor to generate feature descriptor as a one-dimensional array that includes feature values for corresponding features.

In Example 17, the subject matter of any one of Examples 11-16 can optionally include that the instructions, when executed, cause the processor to generate the feature descriptor as twice the bit length of the first image descriptor.

Example 18 is a method that includes generating, by executing an instruction with a processor, a first image descriptor based on a first image of a first retail product tag corresponding to a first retailer category, the first image descriptor representative of one or more visual features; generating, by executing an instruction with a processor, a feature descriptor corresponding to the first retail product tag by concatenating the first image descriptor and a first category signature corresponding to the first retailer category; generating, by executing an instruction with a processor, a first probability value corresponding to a first type of promotional product tag and a second probability value corresponding to a second type of promotional product tag based on the feature descriptor; and determining, by executing an instruction with a processor, whether the first retail product tag corresponds to the first type of promotional product tag or the second type of promotional product tag based on the first probability value and the second probability value.

In Example 19, the subject matter of Example 18 can optionally include generating a seed to generate a Gaussian probability density function of a plurality of image descriptors corresponding to the first retailer category.

In Example 20, the subject matter of any one of Examples 18-19 can optionally include generating the seed during a training phase, the training phase to be separate from a recognition phase during which the classifier determines whether the first retail product tag corresponds to the first type of promotional product tag or the second type of promotional product tag.

In Example 21, the subject matter of any one of Examples 18-20 can optionally include generating a first category signature based on a seed and a plurality of image descriptors corresponding to second retail product tags of the first retailer category.

In Example 22, the subject matter of any one of Examples 18-21 can optionally include storing in a memory a first category signature in association with a retailer identifier corresponding to the first retailer category.

In Example 23, the subject matter of any one of Examples 18-22 can optionally include that the feature descriptor as a one-dimensional array that includes feature values for corresponding features.

In Example 24, the subject matter of any one of Examples 19-23 can optionally include that the feature descriptor as twice the bit length of the first image descriptor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to classify a first retail product tag image, the apparatus comprising:
    memory;
    instructions; and
    at least one processor to execute the instructions to:
        determine, based on operations, a first visual feature of the first retail product tag image, the first retail product tag image corresponding to a first retailer category;
        generate a feature descriptor corresponding to the first retail product tag image based on (a) a first image descriptor, the first image descriptor indicative of the first visual feature, and (b) a category signature, the category signature indicative of the first retail category, the category signature based on samples of a probability distribution function (PDF) of second image descriptors corresponding to the first retailer category;
        generate a first probability value associated with a first type of promotional product tag and a second probability value associated with a second type of promotional product tag, the second type of promotional product tag different than the first type of promotional product tag; and
        determine a respective one of the first type of promotional product tag or the second type of promotional product tag of the first retail product tag image based on the first probability value and second probability value to differentiate the first retail product tag image corresponding to the first retailer category from a second retail product tag image corresponding to a second retailer category.

2. The apparatus of claim 1, wherein the operations include a convolution operation and a pooling operation to determine the first visual feature.

3. The apparatus of claim 1, wherein the first image descriptor is based on the first visual feature and a second visual feature of the first retail product tag image.

4. The apparatus of claim 1, wherein the at least one processor is to generate the feature descriptor by concatenating the category signature with the first image descriptor.

5. The apparatus of claim 4, wherein the at least one processor is to generate the feature descriptor, the feature descriptor having a bit length at least twice as long as the first image descriptor.

6. The apparatus of claim 1, wherein the probability distribution function (PDF) is a Gaussian probability distribution function (PDF), and wherein the at least one processor is to sample the Gaussian probability distribution function (PDF) of the second image descriptors to generate the category signature, the second image descriptors including the first image descriptor.

7. The apparatus of claim 1, wherein the first type of promotional product tag is a multi-buy product tag and the second type of promotional product tag is a price reduction product tag.

8. A non-transitory computer-readable storage medium comprising instructions that, when executed, cause a processor to at least:
    determine, based on operations, a first visual feature of a first retail product tag image, the first retail product tag image corresponding to a first retailer category;
    generate a feature descriptor corresponding to the first retail product tag image based on (a) a first image descriptor, the first image descriptor indicative of the first visual feature, and (b) a category signature, the category signature indicative of the first retail category, the category signature being based on a probability distribution function (PDF) of second image descriptors corresponding to the first retailer category;
    generate a first probability value associated with a first type of promotional product tag and a second probability value associated with a second type of promotional product tag, the second type of promotional product tag different than the first type of promotional product tag; and
    determine a respective one of the first type of promotional product tag or the second type of promotional product tag of the first retail product tag image based on the first probability value and second probability value to differentiate the first retail product tag image corresponding to the first retailer category from a second retail product tag image corresponding to a second retailer category.

9. The non-transitory computer-readable storage medium of claim 8, wherein the operations include a convolution operation and a pooling operation to determine the first visual feature.

10. The non-transitory computer-readable storage medium of claim 8, wherein the first image descriptor is based on the first visual feature and a second visual feature of the first retail product tag image.

11. The non-transitory computer-readable storage medium of claim 8, including further instructions that, when executed, cause the processor to generate the feature descriptor by concatenating the category signature with the first image descriptor.

12. The non-transitory computer-readable storage medium of claim 11, wherein the instructions, when executed, cause the processor to generate the feature descriptor, the feature descriptor having a bit length at least twice as long as the first image descriptor.

13. The non-transitory computer-readable storage medium of claim 8, wherein the probability distribution function (PDF) is a Gaussian probability distribution function (PDF), and including further instructions that, when executed, cause the processor to sample the Gaussian probability distribution function (PDF) of the second image descriptors to generate the category signature, the second image descriptors including the first image descriptor.

14. The non-transitory computer-readable storage medium of claim 8, wherein the first type of promotional product tag is a multi-buy product tag and the second type of promotional product tag is a price reduction product tag.

15. A method to classify a first retail product tag image, the method comprising:
    determining, based on operations, a first visual feature of the first retail product tag image, the first retail product tag image corresponding to a first retailer category;
    generating a feature descriptor corresponding to the first retail product tag image based on (a) a first image descriptor, the first image descriptor indicative of the first visual feature, and (b) a category signature, the category signature indicative of the first retail category, the category signature being based on samples of a probability distribution function (PDF) of a plurality of image descriptors corresponding to the first retailer category;

generating a first probability value associated with a first type of promotional product tag and a second probability value associated with a second type of promotional product tag, the second type of promotional product tag different than the first type of promotional product tag; and determining a respective one of the first type of promotional product tag or the second type of promotional product tag of the first retail product tag image based on the first probability value and second probability value to differentiate the first retail product tag image corresponding to the first retailer category from a second retail product tag image corresponding to a second retailer category.

16. The method of claim 15, wherein the operations include a convolution operation and a pooling operation to determine the first visual feature.

17. The method of claim 15, wherein the first image descriptor is based on the first visual feature and a second visual feature of the first retail product tag image.

18. The method of claim 15, further including generating the feature descriptor by concatenating the category signature with the first image descriptor.

19. The method of claim 18, further including generating the feature descriptor, the feature descriptor having a bit length at least twice as long as the first image descriptor.

20. The method of claim 15, further including generating the category signature by sampling the probability distribution function (PDF) of the plurality of image descriptors corresponding to the first retailer category, the plurality of image descriptors including the first image descriptor, the probability distribution function (PDF) being a Gaussian probability distribution function (PDF).

* * * * *